United States Patent [19]

Schulz

[11] 4,056,833

[45] Nov. 1, 1977

[54] TURNTABLE ASSEMBLY FOR VIDEO CASSETTE RECORDER/REPRODUCER

[75] Inventor: Gordon Schulz, Villa Park, Calif.

[73] Assignee: Odetics, Inc., Anaheim, Calif.

[21] Appl. No.: 665,689

[22] Filed: Mar. 10, 1976

[51] Int. Cl.² ............................................. G11B 15/66
[52] U.S. Cl. ........................................ 360/85; 226/91
[58] Field of Search .......................... 360/85, 95, 96; 242/195, 197–198; 226/91

[56] References Cited

U.S. PATENT DOCUMENTS

| | | | |
|---|---|---|---|
| 3,740,495 | 6/1973 | Kihara | 360/85 |
| 3,784,761 | 1/1971 | Moritan et al. | 360/85 |
| 3,851,816 | 12/1974 | Katoh | 360/95 X |
| 3,864,742 | 2/1975 | Katoh | 360/85 |
| 3,968,517 | 7/1976 | Chimura et al. | 360/85 X |
| 3,969,766 | 7/1976 | Tanaka et al. | 360/85 |

Primary Examiner—John H. Wolff
Attorney, Agent, or Firm—Philip M. Hinderstein

[57] ABSTRACT

A turntable assembly for helically threading tape from a video cassette around a video scanner, for simultaneously threading the tape past a plurality of longitudinal magnetic heads, and for engaging the tape to a capstan drive assembly. The turntable comprises an annular ring that surrounds the scanner and longitudinal heads and provides a platform for rigidly supporting a plurality of guide posts and a pinch roller, the guide posts threading the tape around the scanner and the pinch roller engaging the tape to the capstan drive assembly. The rotational axis of the scanner is tilted relative to the cassette so that the plane of the cassette is coplanar with the entry angle of the scanner and the rotational axis of the turntable ring is tilted relative to the rotational axis of the scanner so that the plane of the ring is coplanar with the exit angle of the scanner. The turntable rotates through an angle which is greater than 360° and means are provided for decelerating the turntable as it reaches the ends of its rotational travel.

16 Claims, 11 Drawing Figures

TURNTABLE ASSEMBLY FOR VIDEO CASSETTE RECORDER/REPRODUCER

BACKGROUND OF THE INVENTION

1. Field of the Invention

The present invention relates to a turntable assembly for a video cassette recorder/reproducer and, more particularly, to a simple, accurate, and reliable turntable assembly for threading tape around a video scanner and across longitudinal magnetic heads and for engaging the tape to a capstan drive assembly.

2. Description of the Prior Art

Video recording tape is commonly supplied in a standard type of cassette to eliminate the problems associated with open reels and the threading of the tape into a video recorder/reproducer. When using a standard video cassette with a video recorder/reproducer, the cassette must be loaded into the system and the reels of the cassette must be mated to the reel drive system of the recorder/reproducer. Thereafter, the tape must be withdrawn from the cassette and threaded around the video scanner of the recorder/reproducer.

The video recorder/reproducers and associated mechanisms that have been developed heretofore have been intended for use in the recording and playing back of standard television type signals in either a home or commercial environment. In such systems, each tape is not used extensively and each frame of information recorded thereon is relatively unimportant since it is almost a duplicate of both the previous frame and the subsequent frame. Accordingly, the careful handling of the tape to maximize the life thereof and to preserve each and every frame of data recorded thereon has not been an important requirement. For similar reasons, accuracy, speed, and reliability of operation have been relatively unimportant considerations. It has also been relatively unimportant that a tape recorded on one machine be playable on another machine and vice versa since usually a single machine was used for recording and playing back information.

Furthermore, in prior systems, the tape travels at low speeds, typically 3¾ inches per second during playback and 45 inches per second during rewind. In addition, the rewinding occurs only after the tape has been unthreaded from the scanner so that the tape travels in only a single direction, for playing of same, when wrapped around the scanner. Furthermore, since the video scanner was typically the only recording/reproducing element in the system and such a scanner requires the tape to be wrapped around only half of the circumference thereof, typical turntables rotate through an angle of less than 360°. It is therefore relatively simple to define the rotational starting and end points thereof.

On the other hand, the present turntable assembly is designed for a video recorder/reproducer intended for use in a document acquisition and retrieval system. This environment places a number of constraints on the video tape and the manner in which it is handled which cannot be satisfied with conventional tape handling mechanisms. For example, in such an environment, significant quantities of data, including address information, may be loaded on a single tape, representing a substantial investment in programming and information. Furthermore, the tape may be loaded and unloaded into the system many times each day. Therefore, in order to preserve each frame of data and to maximize the life of the tape, it becomes critical that the tape be protected and handled in a very gentle manner. Since a tape will typically be recorded in one machine and played back in another machine, it is important that the mechanism that handles the tape does so accurately and reliably so that the tape does not sense any differences from one machine to another.

If a turntable assembly is to be usable in a document acquisition and retrieval system, the threading of the tape must occur rapidly so that the system may quickly go into a search mode. Prior turntable assemblies have been too slow in operation for this use. Still further, because of the environment, the recorder/reproducer may be positioned at any angle, no necessarily horizontal, requiring the turntable assembly to control the tape track in any angular orientation. Accordingly, it is desirable that the turntable assembly not be subject to the influence of gravity, but be able to operate in any position.

The turntable assembly which helically threads the tape around the video scanner must handle the tape in a manner which minimizes the stresses placed thereon. The turntable must insure proper seating of the tape in the guide flange in the surface of the scanner and minimize unsupported tape lengths. Such turntable should have rollers and other guide elements rigidly connected thereto to increase reliability. The turntable must not only be capable of threading the tape around the video scanner, it also must be capable of threading the tape across longitudinal magnetic heads for recording and sensing address information. To achieve this, the turntable should be capable of rotating through an angle greater than 360°.

Still further, in a document acquisition and retrieval system, the tape travels in two directions, during a search mode, at speeds in excess of 400 inches per second and the tape accelerates to such speeds in approximately one second. The system must be capable of so operating with the tape threaded around the video scanner and the longitudinal heads for detecting the address information during the search mode.

Once the turntable assembly has threaded the tape around the video scanner and threaded the tape past the longitudinal heads, means must be provided to activate a pinch roller assembly for holding the tape against a capstan drive shaft. Such mechanism should be simple and direct in operation so as to insure reliability in use. A turntable assembly for a video cassette recorder/reproducer incorporating a mechanism which handles tape in a manner which meets the above requirements has been unavailable heretofore.

SUMMARY OF THE INVENTION

According to the present invention, there is provided a turntable assembly for threading tape around a video scanner and across a plurality of longitudinal magnetic heads and for engaging the tape to a capstan drive assembly. The present assembly is simple, accurate, fast, and reliable and provides the constraints necessary for use in a document acquisition and retrieval system. The present turntable assembly handles the tape gently, maximizing the life thereof and preserving the data thereon. The present turntable assembly insures proper seating of the tape in the guide flange around the video scanner so that tapes recorded on one machine may be readily played back on another machine. The present turntable assembly is not speed limited and provides the degree of control necessary to be capable of operating in any angular orientation.

The present turntable assembly has the capability of rotating through an angle greater than 360° so as to wrap tape not only around a video scanner but across a plurality of longitudinal magnetic heads. In addition, the present turntable assembly permits the tape to travel in two directions, during a search mode, at high speed, with the tape threaded around the scanner. The present turntable assembly had a sufficient number of guide posts which are strategically located to minimize unsupported tape lengths.

In order for the present turntable to rotate more than 360°, a camming mechanism is required which provides the necessary mechanical stops for the turntable. According to the present invention, the present camming mechanism provides a media by which the turntable is frictionally decelerated in either direction during the threading or unthreading operation. The camming mechanism also provides for a system by which the reengagement of the pinch roller to the capstan is achieved. The camming mechanism performs this function by converting the velocity and momentum of the turntable into an actuating force which is applied to the pinch roller. The camming mechanism provides for high pinch roller force in one state and a lower camming force which is utilized only for the purpose of decelerating the turntable in either direction. The mechanism is designed to accomplish this by the utilization of only a single spring to achieve both modes and force level requirements.

Briefly, the present turntable assembly for helically threading tape which has been withdrawn from a video cassette in two diverging directions around a video scanner comprises a video scanner, the rotational axis of the video scanner being tilted relative to the cassette so that the plane of the cassette is coplanar with the entry angle of the scanner, an annular ring surrounding the video scanner and having a rotational axis which is tilted relative to the rotational axis of the scanner so that the plane of the annular ring is coplanar with the exit angle of the scanner, means for rotating the ring between first and second positions, a first post fixedly mounted on the turntable and extending perpendicular thereto, the first post being positioned, relative to the cassette, when the turntable is in the first position, so that the tape engages the first post when it is withdrawn from the cassette in its two diverging directions, and a second post fixedly mounted on the turntable and extending perpendicular thereto, spaced from the first post, the first post releasing the tape upon rotation of the turntable toward the second position, the second post, upon rotation of the turntable from the first to the second position, extending under and behind the tape and engaging the tape and wrapping the tape around the scanner.

The turntable assembly also comprises a plurality of additional guide posts fixedly mounted on the turntable and extending perpendicular thereto, spaced from the second post and from each other, for successively engaging the tape behind the second post to guide and support the tape as the second post wraps the tape around the scanner. According to the preferred embodiment of the invention, the turntable assembly includes a plurality of longitudinal magnetic heads positioned in parallel, spaced relationship and the turntable threads the tape across all of the heads. The turntable rotates through an angle of approximately 390° and incorporates a camming mechanism for defining the first and second positions, for decelerating the turntable as it approaches the first and second positions, and for engaging the tape to a capstan drive shaft.

OBJECTS

It is therefore an object of the present invention to provide a turntable assembly for a video cassette recorder/reproducer.

It is a further object of the present invention to provide a simple, accurate, reliable, high-speed turntable assembly for threading video tape around a video scanner and across longitudinal magnetic heads.

It is a still further object of the present invention to provide a turntable assembly for a video cassette recorder/reproducer which handles tape gently, reliably, and accurately.

It is another object of the present invention to provide a turntable assembly for a video cassette recorder/reproducer which permits tape recorded on one recorder/reproducer to be accurately played back on another recorder/reproducer.

It is still another object of the present invention to provide a turntable assembly for a video cassette recorder/reproducer including a camming mechanism which provides the necessary mechanical stops for the turntable, which frictionally decelerates the turntable in both directions during threading and unthreading operations and which converts the velocity and momentum of the turntable into a force for engaging a pinch roller to a drive capstan.

Another object of the present invention is the provision of a turntable assembly for a video cassette recorder/reproducer which eliminates movable connections between guide rollers and the turntable to increase mechanism reliability.

Still another object of the present invention is the provision of a turntable assembly for a video cassette recorder/reproducer which is fully operational in both directions with the tape wrapped around a video scanner.

A still further object of the present invention is the provision of a turntable assembly for a video cassette recorder/reproducer which insures proper seating of the video tape as it is threaded around a scanner.

Another object of the present invention is the provision of a turntable mounting system that permits rotational movement of the turntable only and eliminates undesirable radial and axial movements.

Still another object of the present invention is the provision of a turntable mounting system which permits operation in any angular orientation.

A still further object of the present invention is the provision of a turntable assembly for a video cassette recorder/reproducer which, at the conclusion of the threading function, insures proper tape alignment and positioning relative to a video scanner, longitudinal magnetic heads, and a pinch roller.

Still further objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

In my copending U.S. Pat. application Ser. No. 650,455, filed Jan. 19, 1976, and entitled Cassette Loader for Video Recorder/Reproducer, now U.S. Pat. No. 4,018,403, there is disclosed a loading mechanism for reliably delivering a standard video cassette onto a pair of reel drive hubs of a video recorder/reproducer, insuring proper seating of the reels on the hubs, and preventing jamming of the video tape. In my copending U.S. Pat. application Ser. No. 650,456, filed Jan. 19, 1976, now U.S. Pat. No. 4,000,866, and entitled Tape Reel Drive System for Video Recorder/Reproducer, there is disclosed a tape reel drive system including a pair of reel drive hubs for positively engaging the tape reels of a standard video cassette and simultaneously taking up any slack in the tape extending between the reels. In my copending U.S. Pat. application Ser. No. 658,689, filed Feb. 17, 1976, and entitled Tape Withdrawal and Tensioning Mechanism for Video Cassette Recorder/Reproducer, there is disclosed a mechanism for withdrawing the video tape from a video cassette in two diverging directions, equally from both reels, to prepare the tape for threading around a video scanner, for sensing tape position to provide inputs to the reel drive servo motors of independent, closed loop servo systems, and for adjusting the level of tension in the video tape during operation of the recorder/reproducer. Accordingly, operation of the inventions of my copending applications results in a standard video cassette being positioned within a video recorder/reproducer with the tape withdrawn from the video cassette, in two diverging directions, ready for the tape to be threaded around the video scanner and across the longitudinal magnetic heads of the recorder/reproducer. It is the function of the present assembly, generally designated 10, to perform this latter function as well as to perform several additional functions.

More particularly, assembly 10 is designed to operate on a standard video cassette 11 of a type well known to those skilled in the art. Cassette 11 houses a pair of reels (not shown) which have a length of tape 12 extending therebetween. For a fuller discussion of a cassette loader and the manner in which it delivers a cassette into a video recorder/reproducer, reference should be had to U.S. Pat. No. 4,018,403. Upon reaching the loaded position, shown in all figures, the reels are positioned on a pair of hubs (not shown) which are driven by independent servo motors (not shown). For a fuller discussion of a complete tape reel drive system, reference should be had to U.S. Pat. No. 4,000,866.

According to the invention of my beforementioned copending U.S. patent application Serial No. 658,689, tape 12 is withdrawn from cassette 11 by means of a pair of arms 13A and 13B, first ends of which support pick-up rollers 14A and 14B, respectively. When cassette 11 is loaded into the recorder/reproducer, pick-up rollers 14A and 14B are initially positioned behind tape 12. Arms 13A and 13B cause rollers 14A and 14B to withdraw tape 12 along approximately linear paths which diverge from cassette 11 at an obtuse angle with respect to each other, rollers 14A and 14B coming to rest in the left and right side positions, respectively, shown in FIGS. 1-3. For a fuller discussion of a tape withdrawal and tensioning mechanism, reference should be had to my beforementioned copending U.S. patent application Ser. No. 658,689.

According to the present invention, as rollers 14A and 14B withdraw tape 12 from cassette 11, tape 12 contacts an elastomeric post 21 which is mounted on an annular turntable ring 20. For present purposes, post 21 insures that tape 12 is withdrawn equally from both reels within cassette 11, also providing a fixed reference point for the operation of assembly 10. Post 21 also insures that tape 12 does not yet contact the video scanner, designated 22, around which tape 12 is to be wrapped. Upon reaching the position shown in FIG. 1, assembly 10 is operative to thread tape 12 around scanner 22.

Scanner 22 is a conventional video scanner including a body having cylindrical outer surface around which tape 12 is wrapped. Scanner 22 has a helical tape guide flange (not shown) in the outer surface thereof which is adapted to receive the bottom edge of tape 12 as it is helically wrapped therearound. Scanner 22 has a rotational axis 23 for a rotating recording/reproducing head positioned therein. By wrapping tape 12 helically around scanner 22 and driving the head within scanner 22 around axis 23, such recording head forms a series of transverse passes across tape 12 as tape 12 moves around scanner 22. The operation of video scanners is well known to those skilled in the art.

Figure 1:
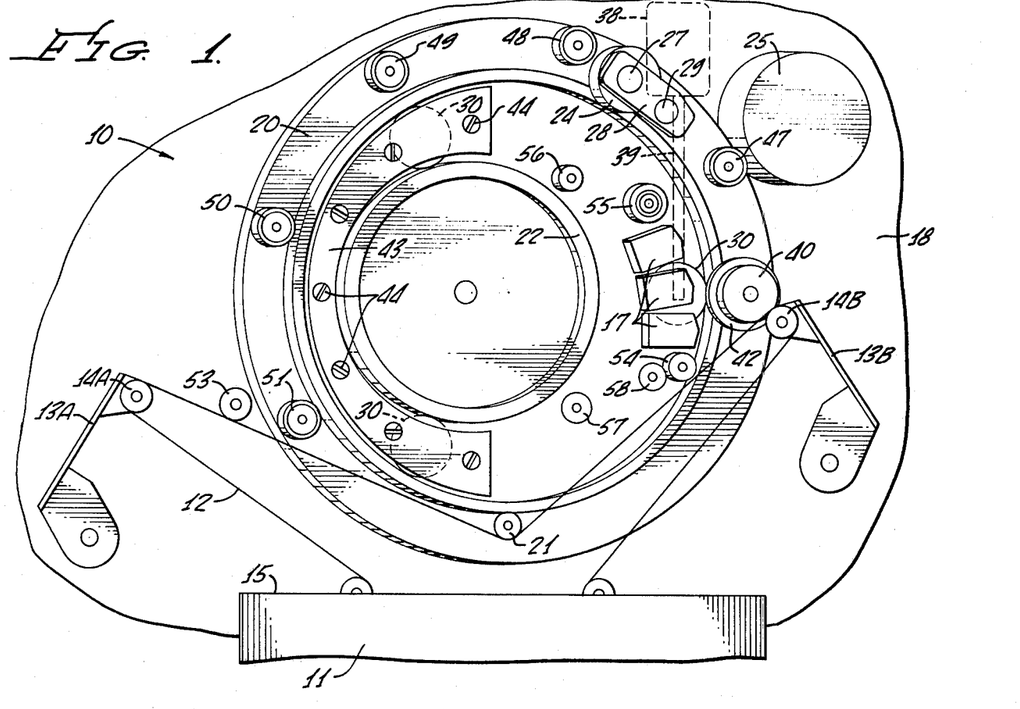
FIG. 1 is a top plan view of a turntable assembly for a video cassette recorder/reproducer constructed in accordance with the teachings of the present invention, showing the assembly in the initial or tape receiving position.

Also as known to those skilled in the art, scanner 22 has an entry angle, the angle at which tape 12 starting around scanner 22 contacts same, and an exit angle, the angle at which tape 12 wrapped around leaves same. According to the present invention, scanner 22 is spaced from the front surface 15 of cassette 11 and rotational axis 23 thereof is tilted in a plane parallel to surface 15 so that the horizontal plane of cassette 11, the plane shown in FIG. 1, is coplanar with the entry angle of scanner 22. This can be seen most clearly in FIG. 5.

Turntable 20 is an annular ring that surrounds scanner 22 and provides a platform for supporting a plurality of elements, including post 21, which, among other things, wrap tape 12 around scanner 22. According to the preferred embodiment of the invention, turntable 20 also threads tape 12 past a plurality of longitudinal magnetic heads 17, positioned between scanner 22 and ring 20, heads 17 being rigidly mounted on a plate 18 which provides a reference frame for assembly 10. As will be described more fully hereinafter, ring 20 has mounted thereon a pinch roller 24 which engages tape 12 and brings it into and holds it in contact with a capstan drive shaft 25.

Turntable ring 20 has a rotational axis 26 which is in the same plane as mentioned previously for axis 23, parallel to front surface 15 of cassette 11. However, axis 26 of ring 20 is tilted relative to the rotational axis 23 of scanner 22 so that ring 20 is coplanar with the exit angle of scanner 22. This too may be seen most clearly in FIG. 5.

Figure 4:
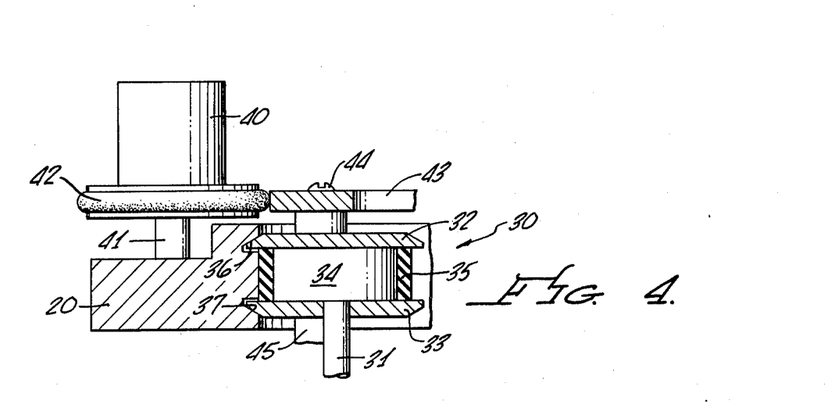
FIG. 4 is an enlarged sectional view taken along the line 4—4 in FIG. 2.

With reference to FIGS. 1 and 4, turntable ring 20 is mounted above frame 18 and traversed via three identical roller elements 30 located at 120° increments. Each roller element 30 includes a shaft 31 on which is mounted a pair of spaced, parallel plates 32 and 33, spaced by a cylindrical drum 34. Plates 32 and 33 are tapered in such a fashion that they engage a pair of parallel, spaced, tapered grooves 36 and 37 in the inner perimeter of turntable ring 20. These matching tapers on plates 32 and 33 and grooves 36 and 37, respectively, act to provide both radial and axial control in the positioning of ring 20.

Shafts 31 of roller elements 30 are mounted for rotation by bearings (not shown) in frame 18. One of roller elements 30 is driven by means of a motor 38 having a drive shaft 39. Drive shaft 39 may include a worm (not shown) which engages a worm wheel (not shown) connected to the shaft 31 of the driven roller element 30. Furthermore, the driven roller element 30 has, in addition to elements 32–34, an elastomeric ring 35 positioned around drum 34, between plates 32 and 33, so as to engage the inside surface of turntable ring 20. Elastomeric ring 35 would have sufficient compression to cause adequate frictional engagement, making turntable ring 20 rotate upon the driving of shaft 31 by motor 38.

As mentioned previously, elastomeric post 21 is rigidly mounted on turntable 20 for rotation therewith. Post 21 is a cylindrical member, the axis of which is perpendicular to the plane of turntable ring 20. Also mounted on turntable ring 20 and extending perpendicular thereto, spaced from post 21, in a counter-clockwise direction as viewed in FIG. 1, is a lead guide roller 40, which is also a generally cylindrical member. Lead guide roller 40 is mounted for rotation relative to turntable ring 20 by means of a shaft 41 and a bearing (not shown) in ring 20. At the base of ring 40 is positioned an elastomeric ring 42 which is adapted to engage, during a portion of the rotation of ring 20, a C-shaped rail 43 mounted between the inner circumference of turntable ring 20 and the other surface of scanner 22. Rail 43 may be connected by a plurality of screws 44 and a plurality of spacers 45 to frame 18 of assembly 10. The relationship of the diameters of roller 40, ring 42, and rail 43 is such as to cause roller 40 to always rotate at a slightly higher peripheral velocity then ring 20 as it carries tape 12 around scanner 22. This rotating of lead guide roller 40 tends to "barber pole" tape 12 in a way that makes tape 12 always tend to maintain a downward pressure against the tape guide flange that is machined into the outer surface of helical scanner 22. This insures proper seating of tape 12 around scanner 22, as will be described more fully hereinafter.

Also fixedly mounted on turntable ring 20 and extending perpendicular thereto, spaced from lead guide roller 40 and from each other in a counterclockwise direction around ring 20, are a plurality of additional cylindrical guide rollers 47–51. As will be described more fully hereinafter, rollers 47–51 successively move in behind lead guide roller 40 to help guide tape 12 around scanner 22.

The remaining element mounted on turntable ring 20 is pinch roller 24. Pinch roller 24 is mounted for rotation on a shaft 27, one end of which is connected to one end of a linkage 28. The other end of linkage 28 is connected via a pin 29 to turntable 20. As will be described more fully hereinafter, this arrangement permits pinch roller 24 to rotate independently of turntable ring 20 and move radially in an arc having pin 29 as its center. Pinch roller 24 is positioned on ring 20 between guide rollers 47 and 48.

Turntable assembly 10 includes a plurality of additional, stationary guide elements for supporting tape 12 when it is wrapped around scanner 22, such elements being connected in any suitable manner to frame 18 of assembly 10. Such guide elements include a fixed roller 53 positioned radially outwardly from turntable ring 20, adjacent to roller 14A. A pair of guide rollers 54 and 55 are mounted on opposite sides of the assembly of longitudinal recording heads 17. Heads 17 are positioned perpendicular to the plane of turntable ring 20 so as to receive tape 12 after it passes around scanner 22. Rollers 54 and 55 are on opposite sides thereof, also perpendicular to the plane of ring 20.

Between roller 55 and scanner 22 is another cylindrical guide roller 56 positioned perpendicular to the plane of ring 20. Roller 56 supports tape 12 between scanner 22 and roller 55. Two remaining guide rollers 57 and 58 are connected between scanner 22 and roller 14B. Guide rollers 57 and 58 are positioned perpendicular to the plane of cassette 11.

Referring now to FIGS. 6–11, turntable assembly 10 includes a camming mechanism, generally designated 60, which provides for the engagement of pinch roller 24 to capstan drive shaft 25 and a media by which turntable ring 20 is frictionally decelerated, in both directions, during the threading and unthreading operations. Camming mechanism 60 also defines the operational limits of travel of turntable ring 20. Camming mechanism 60 includes two cam elements 61 and 62. Cam element 61 pivots around a fixed pivot point defined by a pin 63 connected between one end thereof and frame 18 of assembly 10. Cam element 62 pivots around a movable pivot point defined by a pin 64 connected between one end thereof and the other end of cam element 61. Cam element 62 has a pin 65 connected to the other end thereof which rides in a slot 66 in the one end of cam element 61 whereby slot 66 limits the angular movement of cam element 62. A spring 67 is connected between a pin 68 connected to the other end of cam element 62 and a fixed pin 69 connected to frame 18. Frame 18 has three more pins 70, 71, and 72 connected thereto and positioned on opposite sides of cam elements 61 and 62 to limit the angular movement thereof.

As can be seen in FIGS. 6–11, cam elements 61 and 62 are generally curved members which are positioned directly beneath turntable ring 20, between ring 20 and frame 18, adjacent capstan drive shaft 25. Shaft 27, on which pinch roller 24 is mounted, extends downwardly through a radial slot 73 in turntable ring 20 so as to engage cam elements 61 and 62, as will be described more fully hereinafter.

OPERATION

Returning now to FIG. 1, turntable ring 20 is shown in a first position to which it is driven by motor 38 and in which it is maintained by motor 38 and camming mechanism 60. This is the position of turntable ring 20 when cassette 11 is loaded into the video recorder/reproducer and arms 13A and 13B and rollers 14A and 14B withdraw tape 12 from cassette 11. As tape 12 is withdrawn from cassette 11, it contacts post 21 which provides a fixed reference point for tape 12.

Figure 5:
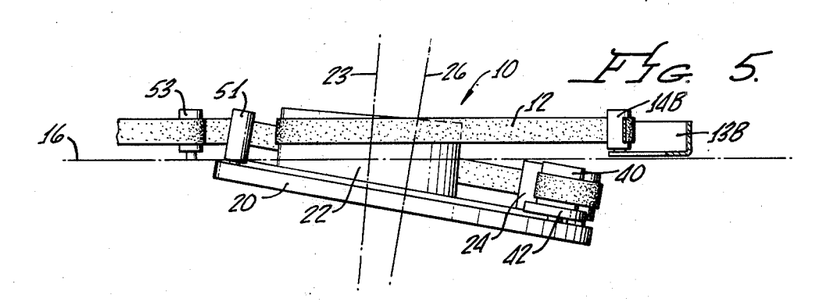
FIG. 5 is a partial, front elevation view taken along the line 5—5 in FIG. 3.

As can be seen from a comparison of FIGS. 1 and 5, the tilting of the rotational axis 23 of scanner 22 and the rotational axis 26 of turntable ring 20 causes the major portion of turntable ring 20 to be positioned in a plane beneath the plane of tape 12 as it is withdrawn from cassette 11. In fact, only the outer perimeter of each guide roller 40 and 47–51 is in the plane of tape 12 when it is at the nine o'clock position, as viewed in FIGS. 1, 2 and 3. Thus, when motor 38 is signaled to cause rotation of ring 20 in a clockwise direction, each guide roller 40 and 47–51 passes beneath the plane of tape 12, adjacent arm 13A and roller 14A, so as to pass beneath and behind tape 12.

Figure 2:
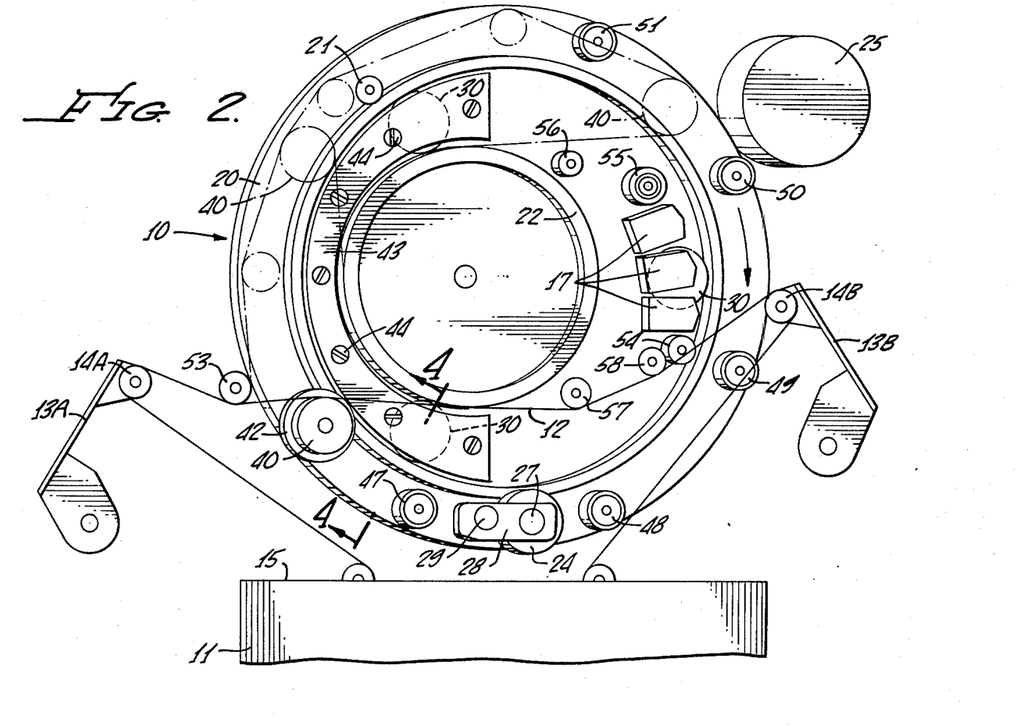
FIG. 2 is a top plan view, similar to FIG. 1, showing the assembly in an intermediate position.

More particularly, when it is desired to thread tape 12 around scanner 22 and longitudinal heads 17, motor 38 is signaled to rotate turntable 20 in a clockwise direction. During approximately the first 90° of rotation of turntable ring 20, post 21 moves from the six o'clock position, as seen in FIG. 1, to a nine o'clock position, not shown, releasing tape 12 and permitting tape 12 to contact rollers 57 and 58 and scanner 22. This position of ring 20 is shown in FIG. 2. It can be seen from an inspection of FIGS. 2 and 5 that during this rotation of ring 20, lead guide roller 40 passed below and behind tape 12 and is now about to contact tape 12 in the vicinity of fixed roller 53. At this same time, ring 42 is engaging fixed rail 43 and is rotating lead guide roller 40 around the axis of shaft 41. This rotation of lead guide roller 40 keeps tape 12 from tending to stick to guide roller 40, pulls tape 12 from the pay out reel in cassette 11, and insures proper seating of tape 12 in the tape guide flange in the surface of scanner 22.

It can further be seen from an examination of FIG. 2 that as lead guide roller 40 wraps tape 12 around scanner 22, each successive guide roller 47 through 51 engages tape 12 and supports tape 12 as it passes back around scanner 22, in spaced relationship relative thereto. In addition, after tape 12 is engaged by lead guide roller 40 and guide roller 47, it is engaged by pinch roller 24.

Figure 3:
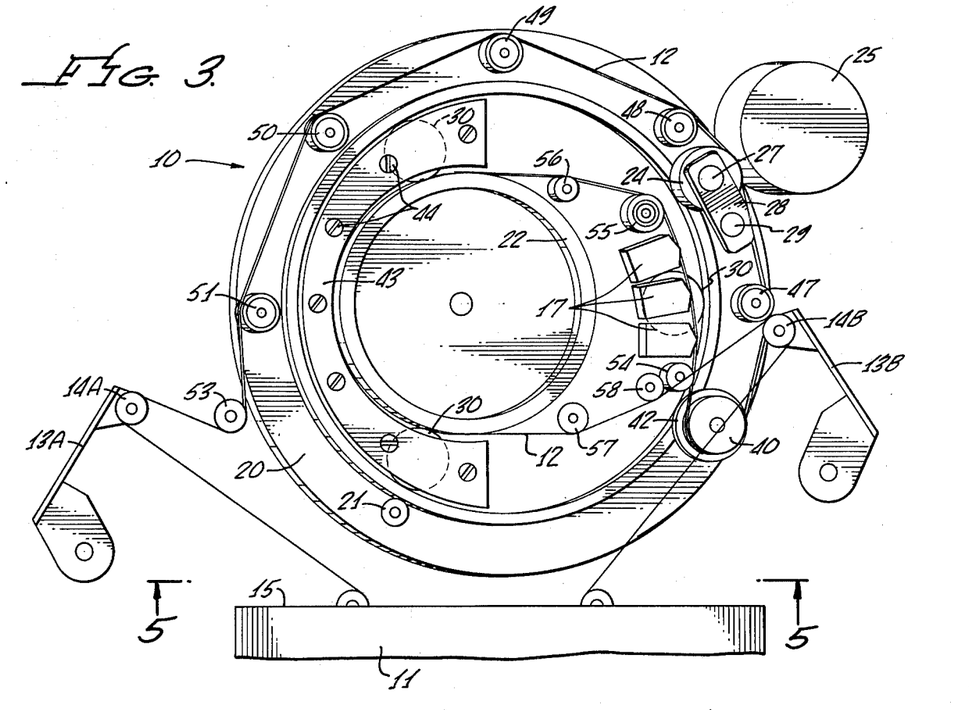
FIG. 3 is a top plan view, similar to FIGS. 1 and 2, showing the assembly with the tape fully threaded around a video scanner and across a plurality of longitudinal magnetic heads.

Referring now to FIG. 3, there is shown the second position of turntable ring 20. That is, after lead guide roller 40 has wrapped tape 12 around scanner 22 through an angle of approximately 180°, tape 12 contacts fixed guide rollers 56 and 55 and then extends across longitudinal heads 17. Tape 12 then engages fixed roller 54 and then extends through an angle of approximately 180° around lead guide roller 40. At this point, tape 12 reverses its direction and engages guide roller 47, pinch roller 24, and guide rollers 48, 49, 50, and 51 on turntable ring 20. Tape 12 then extends around fixed roller 53 before extending around roller 14A and returning to cassette 11.

As can be seen in FIGS. 3 and 5, tape 12 is always perpendicular to one of two planes, either the plane of cassette 11 or the plane of ring 20. Tape 12 is perpendicular to the plane of cassette 11 as it emerges from cassette 11 and passes around roller 14A and roller 53. At this point, tape 12 rotates from a plane perpendicular to cassette 11 to a plane perpendicular to ring 20. Tape 12 remains in this plane as it passes around guide rollers 51, 50, 49, 48, pinch roller 24, roller 47, lead guide roller 40, fixed roller 54, recording heads 17, and fixed rollers 55 and 56. As tape 12 wraps helically around scanner 22, it emerges perpendicular to the plane of cassette 11 and stays so positioned as it passes around rollers 57 and 58 and roller 14B, returning to cassette 11.

Several significant aspects of assembly 10 may now be appreciated. Assembly 10 is basically a simple mechanism, including a single ring 20 and a plurality of fixed guide rollers connected thereto, perpendicular thereto. Turntable ring 20 handles tape 12 gently, minimizing the stresses thereon so as to maximize the life thereof and preserving the data thereon. Lead guide roller 40 functions to insure proper seating of tape 12 around scanner 22 so that tapes recorded on one machine may be readily played back on another machine. Assembly 10 has a sufficient number of guide rollers which are strategically located to minimize unsupported tape lengths. Assembly 10 is fully operational, in both directions, with tape 12 fully threaded in the position shown in FIG. 3.

A key ingredient of turntable assembly 10 is that all tape guidance around scanner 22 is achieved by utilizing only a two axis system. The benefits of the two axis design are that it provides for lower costs of manufacturing, better manufacturing control, a greater degree of control of location of functional elements and it eliminates the need for manual adjustments which are typical in prior video recorder/reproducers.

At the conclusion of the threading operation, turntable assembly 10 supports tape 12 in a manner which insures proper alignment and positioning of tape 12 relative to scanner 22, longitudinal magnetic heads 17, and pinch roller 24. Furthermore, the mounting system for turntable ring 20, namely roller elements 30, permits rotational movement only of turntable ring 20 and eliminates undesirable radial and axial movement. These two factors insure that a system incorporating turntable assembly 10 may be operated at high speed and at any angular orientation.

When it is desired to unthread tape 12 from scanner 22 and longitudinal heads 17, motor 38 is signaled to rotate turntable 20 in a counter-clockwise direction. At the same time, the servo motors for driving the reels within cassette 11 are signaled to wind tape 12 thereon as turntable ring 20 releases tape 12. It will be obvious to those skilled in the art from an examination of FIGS. 1–3 that during the rotation of turntable ring 20 from the position shown in FIG. 3 to the position shown in FIG. 1, the reverse of the threading operation previously described occurs so that the final position is that shown in FIG. 1.

Figure 6:
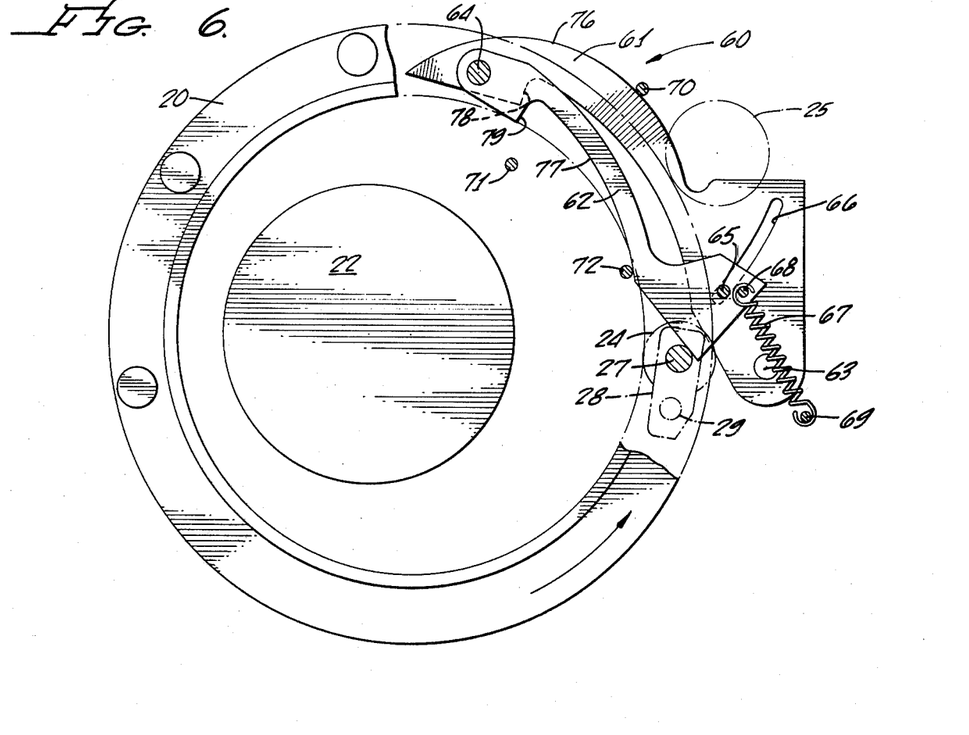
FIGS. 6-10 are partial, top plan views of portions of the turntable assembly of FIGS. 1-5.
Figures 7, 11:
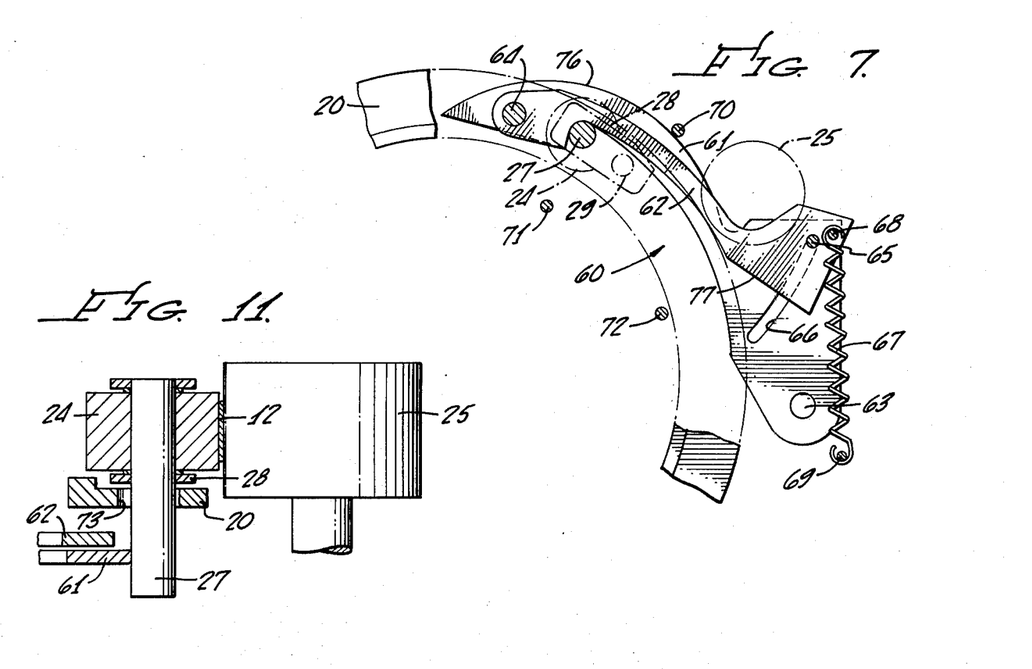
FIG. 11 is a sectional view taken along the line 11—11 in FIG. 10.

Considering now camming mechanism 60, it functions, during the rotation of ring 20, to define the first and second positions of turntable ring 20 and to decelerate ring 20 as it approaches such positions. Referring first to FIG. 6, there is shown an intermediate position of ring 20, approximately half way between the positions shown in FIGS. 1 and 2, as ring 20 rotates in a counter-clockwise direction during the unthreading of tape 12 around scanner 22. In this position, surface 76 of cam element 61 is in contact with fixed pin 70 and surface 77 of cam element 62 is in contact with pin 72. Cam elements 61 and 62 are maintained in these positions by spring 67. As mentioned previously, shaft 27, on which pinch roller 24 is mounted, extends downwardly through slot 73 in ring 20 so as to engage the surfaces of cam elements 61 and 62. In the position shown in FIG. 6, pin 27 is just coming into contact with surface 77 of cam element 62. Since surface 77 is in the path of travel of shaft 27, shaft 27 causes cam element 62 to rotate about pin 64, causing pin 65 to slide in slot 66 and stretching spring 67. It is this constant stretching of spring which places a greater and greater frictional force on shaft 27, functioning to decelerate ring 20 as it approaches the first position. Such first position is shown in FIG. 7. Spring 67 has been substantially stretched and shaft 27 has come to rest on a pair of abutments 78 and 79 on cam elements 61 and 62, respectively, thereby defining the first position of turntable ring 20.

When motor 38 is energized to cause rotation of ring 20 in a clockwise direction, the first movement of camming mechanism 60 is from the position shown in FIG. 7 to the position shown in FIG. 6 where spring 67 is relaxed and surface 77 of cam element 62 again comes into contact with fixed pin 72. Surface 76 of cam element 61 is also in contact with pin 70.

Figure 8:
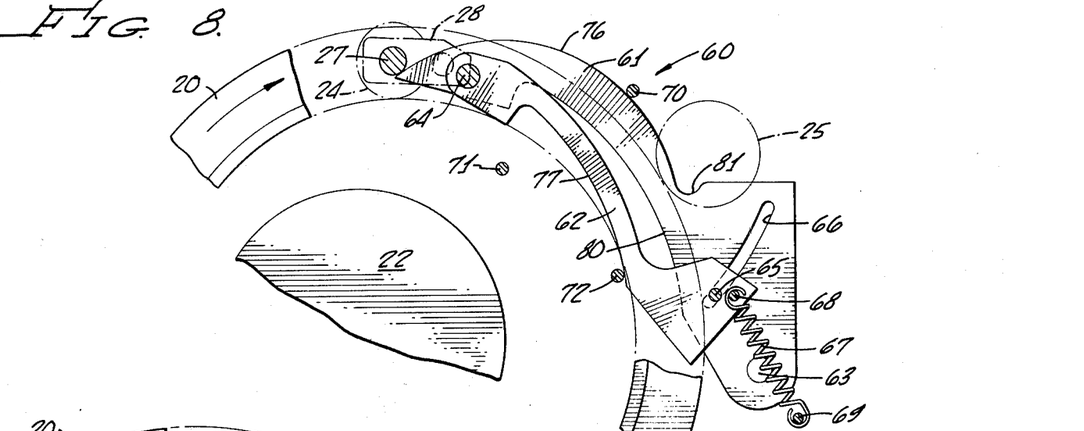

Cam elements 61 and 62 remain in these positions until pinch roller 24 moves almost through an angle of 360° around axis of rotation 26. As pinch roller 24 reaches the twelve o'clock position, as shown in FIG. 8, it comes into contact with surface 76 of cam element 61. Since the leading edge of surface 76 is radially inward of shaft 27, shaft 27 causes cam element 61 to begin to pivot inwardly, about pivot point 63.

Figure 9:
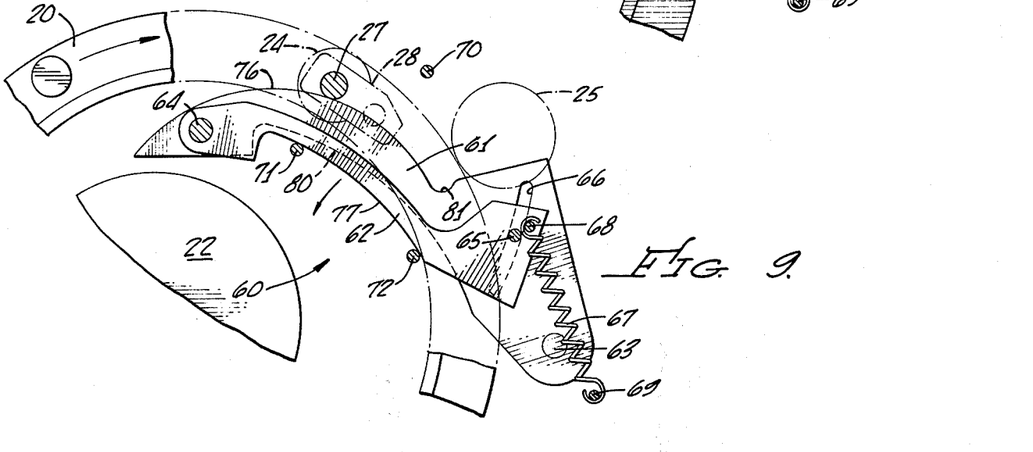
Figure 10:
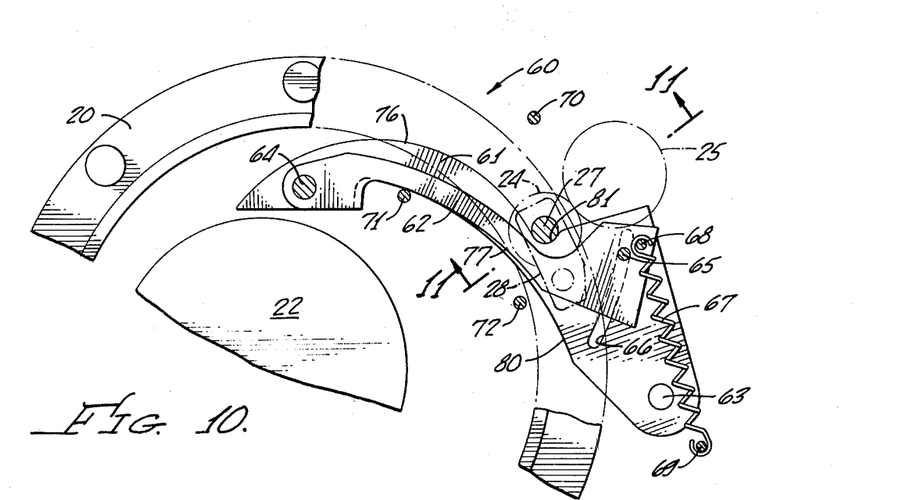

As turntable ring 20 continues to rotate, cam element 61 continues to pivot inwardly to the position shown in FIG. 9. During this rotation, surface 77 of cam element 62 remains in contact with fixed pin 72. This causes spring 67 to constantly stretch and this constantly increasing force on shaft 27 is transmitted to turntable ring 20 to frictionally decelerate same.

When cam elements 61 and 62 reach the positions shown in FIG. 9, surface 77 of cam element 62 engages fixed pin 71 so that surface 77 can no longer continue to move radially inwardly. However, at this point, the surface 80 of cam element 61 opposite to surface 76 thereof is still spaced from pin 71. Therefore, as turntable ring 20 continues to rotate, pin 71 becomes the fixed pivot point and cam element 62 begins to pivot outwardly. This action may be seen from a comparison of FIGS. 9 and 10. In other words, during the last few degrees of rotation of ring 20, as shaft 27 forces surface 80 of cam element 61 towards pin 71, the slight inward movement of pin 64 at one end of cam element 62 is substantially multiplied at the other end thereof, causing a substantial outward movement of pin 65 and a substantial stretching of spring 67. This causes an increase in the rate at which spring 67 is being stretched, causing a substantial stretching of spring 67. Furthermore, this stretching of spring 67 creates a clockwise force on cam element 62, about pin 71, which is resisted by cam element 61. As a result, a substantial clockwise force is placed on cam element 61 about fixed pivot point 63 and this force is applied to shaft 27. Remembering that shaft 27 has pinch roller 24 connected thereto, pinch roller 24 is driven radially outwardly, into contact with capstan drive shaft 25. At the same time, shaft 27 engages an abutment 81 on surface 76 of cam element 61, defining the second position of turntable ring 20, approximately 390° from the first position.

In other words, camming mechanism 60 provides a media by which turntable ring 20 is frictionally decelerated in either direction during the threading or unthreading operation. Camming mechanism 60 also provides for a system by which the engagement of pinch roller 24 to capstan drive shaft 25 is achieved. Camming mechanism 60 performs this function by converting the velocity and angular momentum of turntable ring 20 into a force on cam elements 61 and 62 which stretches spring 67. Therefore, rather than literally wasting the energy contained in the rotating turntable ring 20, camming mechanism 60 uses this energy to activate the force on pinch roller 24. Camming mechanism 60 provides for a high pinch roller force in one state and a lower camming force which is utilized only for the purpose of decelerating turntable 20 in either direction.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A turntable assembly for helically threading tape which has been withdrawn from a video cassette around a video scanner and across a plurality of longitudinal magnetic recording/reproducing heads, the rotational axis of said video scanner being tilted relative to said cassette, comprising:

an annular turntable ring surrounding said video scanner and said heads and having a rotational axis which is tilted relative to said rotational axis of said scanner and said video cassette, said magnetic heads being positioned in parallel, spaced relationship, coplanar to said turntable ring;

means for rotating said turntable ring between first and second positions; and a lead guide post fixedly mounted on said turntable ring and extending perpendicular thereto, said lead guide post being positioned, in said first position of said turntable ring, out of the plane of said cassette, said lead guide post, upon rotation of said turntable ring from said first to said second position, intersecting the plane of said video cassette so as to engage said tape withdrawn therefrom and wrap said tape around said scanner, said lead guide post threading said tape across all of said longitudinal magnetic heads as said turntable ring rotates from said first to said second position, said turntable ring rotating through an angle greater than 360° in threading said tape around said scanner and across said magnetic heads.

2. A turntable assembly according to claim 1 further comprising:

means for decelerating said turntable ring as said turntable ring approaches said second and said first positions during rotation of said turntable ring between said first and second positions.

3. A turntable assembly for helically threading tape which has been withdrawn from a video cassette around a video scanner, the rotational axis of said video scanner being tilted relative to said cassette, comprising:

an annular turntable ring surrounding said video scanner and having a rotational axis which is tilted relative to said rotational axis of said scanner and said video cassette;

means for rotating said turntable ring between first and second positions;

a lead guide roller rotatably mounted on said turntable ring and having an axis extending perpendicular thereto, said lead guide roller being positioned, in said first position of said turntable ring, out of the plane of said cassette, said lead guide roller, upon rotation of said turntable ring from said first to said second position, intersecting the plane of said video cassette so as to engage said tape withdrawn therefrom and wrap said tape around said scanner; and positive drive means for rotating said lead guide roller around said axis as said turntable ring rotates from said first to said second position.

4. A turntable assembly according to claim 2 wherein said drive means for rotating said lead guide roller rotates said guide roller at a slightly higher peripheral velocity than the velocity of said tape during rotation of said turntable ring from said first to said second position.

5. A turntable assembly according to claim 4 wherein said drive means for rotating said lead guide roller comprises:
   a drive ring connected to said guide roller and mounted therewith for rotation on said turntable ring; and
   a fixed cylindrical rail mounted between said turntable ring and said scanner, said drive ring engaging said rail and rotating said lead guide roller as said turntable ring rotates around said scanner.

6. A turntable assembly according to claim 3 wherein said turntable ring is positioned relative to said scanner so that the perimeter of said guide post contacts said tape at the intersection of a plane parallel to said plane of said annular ring and passing through the midpoint of said guide post and a plane parallel to said plane of said cassette and passing through the midpoint of said tape.

7. A turntable assembly for helically threading tape which has been withdrawn from a video cassette around a video scanner, the rotational axis of said video scanner being tilted relative to said cassette, comprising:
   an annular turntable ring surrounding said video scanner and having a rotational axis which is tilted relative to said rotational axis of said scanner and the plane of said cassette;
   means for rotating said turntable ring between first and second positions;
   a lead guide post fixedly mounted on said turntable ring and extending perpendicular thereto, said lead guide post being positioned, in said first position of said turntable ring, out of the plane of said cassette, said lead guide post, upon rotation of said turntable ring from said first to said second position, intersecting the plane of said video cassette so as to engage said tape withdrawn therefrom and to wrap said tape around said scanner;
   a drive capstan mounted in radially spaced relationship to said turntable ring for driving said tape when said tape is threaded around said scanner;
   a pinch roller mounted on said turntable ring and extending perpendicular thereto, spaced from said lead guide post, said pinch roller being mounted for limited radial movement relative to said turntable ring; and
   a cam mechanism including at least one movable linkage and a spring connected thereto, said pinch roller engaging said movable linkage as said turntable reaches said second position, the velocity and momentum of said turntable ring stretching said spring, said movable linkage and said stretched spring providing the only force for holding said pinch roller against said drive capstan.

8. A turntable assembly according to claim 7, wherein said cam mechanism includes means for converting said velocity and momentum of said turntable ring into an actuating force to hold said pinch roller against said drive capstan, simultaneously decelerating said turntable ring as said turntable ring approaches said second position.

9. A turntable assembly according to claim 8 wherein said cam mechanism includes first and second movable linkages positioned adjacent said turntable ring and said drive capstan, one end of said first linkage being pivotably connected to a fixed reference point, one end of said second linkage being pivotably connected to the other end of said first linkage, said spring being connected between the other end of said second linkage and a fixed reference point, said pinch roller being mounted on a shaft which extends through said turntable ring and engages said first or said second linkage as said turntable ring approaches said first and said second positions, stretching said spring and frictionally decelerating said turntable ring.

10. A turntable assembly according to claim 9 wherein said movable linkages have stops thereon for defining said first and second positions of said turntable ring.

11. A turntable assembly for helically threading tape which has been withdrawn from a video cassette around a video scanner, comprising:
    an annular turntable ring surrounding said video scanner, said turntable ring having a pair of parallel, axially spaced, tapered grooves in the inner perimeter thereof;
    means for supporting and rotating said turntable ring for rotational movement only between first and second positions and preventing radial and axial movement thereof, said supporting and rotating means comprising a plurality of roller elements located at spaced increments around said turntable ring, each of said roller elements comprising:
    a shaft; and
    a pair of spaced, parallel discs mounted on said shaft, the outer perimeter of each disc being tapered to match said tapered grooves in said turntable ring, said roller elements being positioned so that said discs extend into and engage said grooves in said ring to provide both radial and axial control in the positioning thereof; and
    a lead guide post fixedly mounted on said turntable ring and extending perpendicular thereto for wrapping said tape around said scanner as said turntable ring rotates from said first to said second position.

12. A turntable assembly according to claim 11, further comprising:
    means for driving said shaft of one of said roller elements; and
    an elastomeric ring positioned between said plates of said one roller element, said ring engaging said inner perimeter of said turntable ring for driving same.

13. A turntable assembly for helically threading tape from a video cassette around a video scanner comprising:
    an annular turntable ring surrounding said video scanner;
    means for rotating said turntable ring between first and second positions;
    a lead guide post mounted on said turntable ring and extending therefrom;

means for causing said guide post, upon rotation of said turntable ring from said first to said second position, to extend under and behind said tape and engage said tape and wrap said tape around said scanner;

a drive capstan mounted in radially spaced relationship to said turntable ring for driving said tape when said tape is threaded around said scanner;

a pinch roller mounted on said turntable ring, spaced from said lead guide post, said pinch roller being mounted for limited radial movement relative to said turntable ring; and a cam mechanism including at least one movable linkage and a spring connected thereto, said pinch roller engaging said movable linkage as said turntable reaches said second position, the velocity and momentum of said turntable ring stretching said spring, said movable linkage and said stretched spring providing the only force for holding said pinch roller against said drive capstan.

14. A turntable assembly according to claim 13, wherein said cam mechanism converts said velocity and momentum of said turntable ring into an actuating force to hold said pinch roller against said drive capstan and simultaneously decelerates said turntable ring as said turntable ring approaches said second position.

15. A turntable assembly according to claim 14 wherein said cam mechanism includes first and second movable linkages positioned adjacent said turntable ring and said drive capstan, one end of said first linkage being pivotably connected to a fixed reference point, one end of said second linkage being pivotably connected to the other end of said first linkage, said spring being connected between the other end of said second linkage and a fixed reference point, said pinch roller being mounted on a shaft which extends through said turntable ring and engages said first or second linkage as said turntable ring approaches said first and said second positions, stretching said spring and frictionally decelerating said turntable ring.

16. A turntable assembly according to claim 15 wherein said movable linkages have stops thereon for defining said first and second positions of said turntable ring.

* * * * *